US005705103A

United States Patent [19]
Chopdekar et al.

[11] Patent Number: 5,705,103
[45] Date of Patent: Jan. 6, 1998

[54] COMPOSITION FOR PRODUCING CHEMILUMINESCENT LIGHT OF CONTROLLABLE DURATION

[75] Inventors: Vilas M. Chopdekar, Edison; James R. Schleck, Somerset; Cheng Guo, Harrison; Amanda J. Hall, Raritan, all of N.J.

[73] Assignee: Jame Fine Chemicals, Inc., Bound Brook, N.J.

[21] Appl. No.: 755,131

[22] Filed: Nov. 22, 1996

[51] Int. Cl.$^6$ .................................................. C09K 3/00
[52] U.S. Cl. ................................. 252/700; 362/34
[58] Field of Search ............................. 252/700; 362/34

[56] References Cited

U.S. PATENT DOCUMENTS

| | | | |
|---|---|---|---|
| Re. 35,007 | 8/1995 | Cohen et al. | 252/700 |
| 3,350,553 | 10/1967 | Cline | 252/700 |
| 3,539,794 | 11/1970 | Rauhut et al. | 240/2.25 |
| 3,671,450 | 6/1972 | Rauhut et al. | 252/700 |
| 3,816,325 | 6/1974 | Rauhut et al. | 252/700 |
| 3,893,938 | 7/1975 | Rauhut | 252/188.3 |
| 3,994,820 | 11/1976 | Maulding et al. | 252/700 |
| 4,859,369 | 8/1989 | Baretz et al. | 252/700 |
| 5,121,302 | 6/1992 | Bay et al. | 252/700 |
| 5,173,218 | 12/1992 | Cohen et al. | 252/700 |
| 5,281,367 | 1/1994 | Schleck et al. | 252/700 |
| 5,597,517 | 1/1997 | Chopdekar et al. | 252/700 |

*Primary Examiner*—Philip Tucker
*Attorney, Agent, or Firm*—Jack Matalon

[57] ABSTRACT

A chemiluminescent composition comprising an oxalate component comprising polystyrene or homopoly-α-methylstyrene containing an oxalate ester; an activator component comprising a solution of a peroxide compound and a catalyst in a first solvent; and a fluorescer contained in the oxalate component, activator component, or in both the oxalate component and the activator component. The first solvent is preferably a propylene glycol dialkyl ether. The chemiluminescent composition, when activated, permits light to be produced of controllable duration.

24 Claims, No Drawings

1

COMPOSITION FOR PRODUCING CHEMILUMINESCENT LIGHT OF CONTROLLABLE DURATION

FIELD OF THE INVENTION

The invention relates to a chemiluminescent composition which, upon admixture of the components, produces light of satisfactory intensity. The composition offers the unique advantage of controllable duration.

BACKGROUND OF THE INVENTION

Chemiluminescent compositions which produce light upon admixture of two components are well known. The two components are kept separate until light is desired. At the desired time, the two components are mixed and light is produced. The intensity and color of the light will depend on the ingredients of the two components.

The first component is an oxalate component which comprises an oxalate ester. The second component is an activator component which comprises a peroxide compound and a catalyst. The composition also includes a fluorescer which may be present in either or both components.

The chemiluminescent composition must also include a solvent for the oxalate component and a solvent or mixture of solvents for the activator component. The solvents for the two components may be different but should be miscible.

The solvent selected for the oxalate component must solubilize the selected oxalate ester and the solvent or mixture of solvents for the activator component must solubilize the selected peroxide and the selected catalyst. If the fluorescer is present in the oxalate component, the solvent selected for the oxalate component must solubilize the selected fluorescer as well as the selected oxalate ester. If the fluorescer is present in the activator component, the solvent must solubilize the selected fluorescer, the selected peroxide compound and the selected catalyst.

Typically, prior art chemiluminescent devices will contain each component in separate chambers. When the production of light is desired, a chamber is ruptured in a manner such that the two components will be allowed to intermix. A problem associated with prior art chemiluminescent compositions is that when the two components are permitted to mix, chemiluminescent light of very high intensity is quickly produced, but such chemiluminescent light production lasts a relatively short period of time. It would be desirable if a method could be created such that chemiluminescent light of controllable duration is produced when the two components are allowed to intermix.

SUMMARY OF THE INVENTION

A chemiluminescent composition has now been discovered whereby it is possible to manufacture conventional chemiluminescent devices which will, upon permitting the two components to intermix, produce light of controllable duration. For the purposes of the present invention, the term "controllable duration" means that two variables may be controlled as desired: the total glow time may be varied and the point in time at which commencement of light production occurs may also be varied.

DETAILED DESCRIPTION OF THE INVENTION

In its broadest sense, the chemiluminescent compositions of the invention comprise two components and a fluorescer which may be present in either or both of the components.

2

The two components are referred to as the oxalate component and the activator component.

The oxalate component comprises a polymer containing an oxalate ester. For the purposes of this invention, the polymer is a homopolymer of styrene or α-methylstyrene. In general, the homopolymer will have a weight average molecular weight of about 1,000 to 500,000, preferably 25,000 to 300,000.

By appropriate selection of the molecular weight of the homopolymer, the total glow time as well as the point in time at which commencement of light production occurs may be varied. For example, by selecting a homopolymer having a low weight average molecular weight, the total glow time will be shortened (and the intensity of light production will be enhanced) and light production will occur shortly after the two components have been intermixed. On the other hand, by selecting a homopolymer having a high weight average molecular weight, the total glow time will be lengthened (and the intensity of light production will be diminished) and light production will occur after a significant delay after the two components have been intermixed. Other techniques for achieving controllable duration of the chemiluminescent light are discussed below.

The oxalate ester is present in the oxalate component in an amount of about $10^{-4}$ to 5M preferably 0.1 to 1M. Suitable oxalate esters include bis(2,4,5-trichloro-6-carbopentoxyphenyl)oxalate; bis(2,4,5-tri-chlorophenyl) oxalate; bis(2,4,5-tribromo-6-carbohexoxyphenyl)oxalate; bis(2-nitrophenyl)oxalate; bis(2,4-di-nitrophenyl) oxalate; bis(2,6-dichloro-4-nitrophenyl)oxalate; bis(2,4,6-trichlorophenyl)oxalate; bis(3-trifluoromethyl-4-nitrophenyl)oxalate; bis(2-methyl-4,6-dinitrophenyl) oxalate; bis(1,2-dimethyl-4,6-dinitrophenyl)oxalate; bis(2,4-dichlorophenyl)oxalate; bis(2,4-dinitrophenyl)oxalate; bis (2,5-dinitrophenyl)oxalate; bis(2-formyl-4-nitrophenyl) oxalate; bis(pentachlorophenyl)oxalate; bis(1,2-dihydro-2-oxo-1-pyridyl)glyoxal; bis(2,4-dinitro-6-methylphenyl) oxalate; and bis-N-phthalimidyl oxalate. The preferred oxalate esters are bis(2,4,5-trichloro-6-carbopentoxyphenyl) oxalate and bis(2,4,5-trichlorophenyl)oxalate.

The oxalate component of the composition of the invention is conveniently prepared in the form of a solid solution of the oxalate ester in the polymer. This may be readily accomplished by heating the polymer to a temperature above its glass transition temperature, e.g. to a temperature in the range of about 50° to 300° C. preferably 80° C. to 180° C. stirring in the selected oxalate ester until it is thoroughly mixed and thereafter allowing the mixture to cool to ambient temperature.

Generally, the weight ratio of the oxalate component to the activator component will be in the range of about 1:99 to 99:1 parts The activator component comprises a solution of a peroxide compound and a catalyst in a first solvent. Preferably, the first solvent comprises a propylene glycol dialkyl ether containing one to three propylene moieties and each alkyl group is independently a straight-chain or branched-chain alkyl group containing up to 8 carbon atoms. Especially preferred first solvents are propylene glycol dialkyl ethers containing two propylene moieties such as dipropylene glycol dimethyl ether, dipropylene glycol diethyl ether and dipropylene glycol di-t-butyl ether. The particularly preferred first solvent comprises dipropylene glycol dimethyl ether.

Typically, the peroxide is present in the activator component in an amount of about $10^{-5}$ to 15M. Suitable peroxides include hydrogen peroxide; sodium peroxide; sodium perborate; sodium pyrophosphate peroxide; urea peroxide; histidine peroxide; t-butyl-hydroperoxide; and peroxybenzoic acid. The preferred peroxide compound comprises hydrogen peroxide.

Generally, the catalyst is present in the activator component in an amount of about $1 \times 10^{-6}$ to $1 \times 10^{-1}$M. Suitable catalysts include sodium salicylate; sodium-5-fluorosalicylate; sodium-5-chloro-salicylate; sodium-5-bromosalicylate; sodium trifluoro-acetate; potassium salicylate; potassium pentachlorophenolate; lithium salicylate; lithium-3-chloro-salicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichlorosalicylate; and magnesium-3,5,6-trichlorosalicylate. The preferred choices for the catalyst are sodium-5-chlorosalicylate and lithium-5-chlorosalicylate.

Typically, the fluorescer is present in the oxalate component or in the activator component or in both the oxalate component and the activator component in a total amount of about $10^{-5}$ to 5M. Suitable fluorescers include 2-ethyl-9,10-bis(phenylethynyl)anthracene; 2-chloro-9,10-bis(4-ethoxyphenyl)anthracene; 2-chloro-9,10-bis(4-methoxyphenyl)anthracene; 9,10-bis(phenylethynyl)anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis(phenylethynyl)tetracene; 9,10-diphenyl-anthracene; perylene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-di-neopentyl-3,4,9,10-perylene dicarboximide; 1,6,7,12-tetra(p-t-butylphenoxy)N,N'-dineopentyl-3,4,9,10-perylene dicarboximide; 1,6,7,12-tetra(o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'-bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; and 1,4-dimethyl-9,10-bis(phenylethynyl)anthracene. The preferred fluorescers are 2-ethyl-9,10-bis(phenylethynyl) anthracene and 2-chloro-9,10-bis(4-ethoxyphenyl) anthracene.

Instead of preparing the oxalate component by heating the selected polymer to a temperature above its glass transition temperature but below the decomposition temperature of the selected oxalate ester and mixing the oxalate ester with the heated polymer, it may be prepared by dissolving the selected polymer and the selected oxalate ester in a second solvent and thereafter removing the second solvent. Preferably, the second solvent is one having a high vapor pressure such that it can be readily removed at a temperature below the decomposition temperature of the selected oxalate ester. An excellent choice for the second solvent is methylene chloride.

The polymer for the oxalate component may vary considerably in weight average molecular weight. Indeed, one may choose a relatively low weight average molecular weight polymer which is quite soluble in the first solvent to produce chemiluminescent light of relatively high intensity, but of moderate duration. Alternatively, one may choose a relatively high weight average molecular weight polymer which is only moderately soluble in the first solvent to produce chemiluminescent light of moderate intensity, but of relatively long duration.

For example, in the case of a polymer consisting of homopolystyrene having a weight average molecular weight of about 50,000, an oxalate ester consisting of bis(2,4,5-trichloro-6-carbopentoxy-phenyl) oxalate or bis(2,4,5-trichlorophenyl)oxalate, a first solvent consisting of dipropylene glycol dimethyl ether, a catalyst consisting of sodium-5-chloro-salicylate or lithium-5-chloro-salicylate, a peroxide component consisting of hydrogen peroxide and a fluorescer consisting of 2-ethyl-9,10-bis(phenylethynyl) anthracene or 2-chloro-9,10-bis(4-ethoxyphenyl) anthracene, it is possible to produce chemiluminescent light of high intensity which lasts about 24 hours. On the other hand, if the homopolystyrene having the 50,000 weight average molecular weight is replaced by a homopolystyrene having a weight average molecular weight of about 250,000 and all the other components remain the same, it is possible to produce chemiluminescent light having satisfactory intensity which lasts for about 96 hours.

The compositions of the invention lend themselves to use in a wide variety of devices. For example, light sticks may be constructed in the form of an inner tubular member contained within an outer tubular member. The inner tubular member (of any desired shape or configuration would contain the activator component and be encased by a frangible glass or plastic wall, whereas the outer tubular member could consist of the oxalate component (molded in any desired shape or configuration). If desired, plasticizers and/or elastomers could be incorporated in the oxalate component prior its being molded in order to lend flexibility to the outer tubular member. The device could then be readily activated by bending it such that the wall of the inner tubular member breaks, thereby allowing the activator component to come into contact with the outer tubular member comprising the oxalate component.

The compositions of the invention may also be employed in devices such as light sticks wherein it is desired to delay the initiation of chemiluminescent light after the inner tubular member containing the activator component has been broken. Such delayed onset of the chemiluminescent light may be readily accomplished by interposing a barrier of a suitable material between the outer wall of the inner tubular member and the inner wall of the outer tubular member.

A suitable barrier would be comprised of a material that would be soluble in the selected first solvent, e.g. a sheet of a polymer such as polystyrene or poly-α-methylstyrene which would not contain any oxalate ester. The onset delay of the chemiluminescent light may be controlled by varying the thickness of the barrier and/or the weight average molecular weight of the polymer.

Alternatively, the oxalate component could be absorbed, dispersed or coated onto a porous, nonporous or absorbent material such as paper, felt, cloth, metallic foils, fiberglass, cellulosic sponge, glass, transparent or translucent plastics such as polyacrylates, polyolefins, cellophane, "Mylar", nylon, teflon, elastomers, wood, etc. The substrates may be prepared in any desired shape such as tapes, spirals, flat sheets, tubes, bottles, powder, aggregates, etc. Multi-color devices consisting of bands of different coloration may be readily prepared by incorporating different fluorescers (corresponding to the desired colors) in the oxalate component and depositing separate bands of each such oxalate component upon the desired substrates.

The following nonlimiting examples shall serve to illustrate the invention. Unless otherwise indicated, all parts and percentages are by weight.

EXAMPLE 1—Preparation of Oxalate Component

A one-liter, 3-neck flask was fitted with a stirrer, nitrogen blanket and heating mantle. The flask was purged with nitrogen and thereafter, 135 g of homopolystyrene having a weight average molecular weight of 45,000 was added to the flask while continuing the nitrogen purge. The flask was heated to a temperature of 130°–140° C. which caused the homopolystyrene to melt. Thereafter, 15 g of bis(2,4,5-trichloro-6-carbopentoxyphenyl)oxalate (hereinafter referred to as "CPPO") was slowly added, with stirring to the flask while under nitrogen purge. The flask was heated with stirring to 180°–200° C. and held at such temperature for 10 minutes. The molten mass was removed from the flask and allowed to cool to room temperature in the form of a film of a thickness of approximately 0.6 cm.

EXAMPLE 2—Preparation of Activator Component

To 1,000 g of dipropylene glycol dimethyl ether (hereinafter referred to as "J-100") was added 1 g of a green dye fluorescer, 2-ethyl-9,10-bis(phenylethynyl) anthracene, to form solution I. To 1,000 g of J-100 was added 5 g of 70% hydrogen peroxide and 0.18 g of lithium-5-chloro-salicylate to form solution II. Thereafter, 30 ml of solution I was mixed with 10 ml of solution II to form 40 ml of activator component. To such activator component was added 5 g of the oxalate component prepared in Example 1. An immediate green glow was observed which lasted in duration for about 2 days. The amount of oxalate ester employed in producing the glow was 0.5 g which corresponded to a weight percentage of 1.2% which compared favorably with the amount of 7–8 wt. % typically employed in conventional prior art light sticks.

EXAMPLE 3

Example 1 was repeated using 160 g of homopolystyrene having a weight average molecular weight of 180,000 instead of the homopolystyrene employed in Example 1. Also, 40 g of CPPO, rather than 15 g, were employed in this Example. To 40 ml of the activator component prepared in Example 2 were added 5 g of the oxalate component of this Example and the procedure of Example 2 was repeated. An immediate green glow was observed which lasted in duration for about 4 days. The amount of oxalate ester employed in producing the glow in this Example was 1.0 g which corresponded to a weight percentage of 2.4%.

EXAMPLE 4

Examples 2 and 3 were repeated. The oxalate component comprised 150 g of homopolystyrene having a weight average molecular weight of 230,000 and 50 g of CPPO. A 10 g sample of this oxalate component (corresponding to 2.5 g of CPPO) was placed in contact with 40 ml of the activator component of Example 2. An immediate green glow was observed which lasted for about 2 days.

EXAMPLE 5

Example 1 was repeated using 150 g of homopolystyrene having a weight average molecular weight of 45,000, 50 g of CPPO and 0.5 g of the same green dye fluorescer as employed in Example 1. To 30 ml of the activator component of Example 2 were added 5 g of the oxalate component of this Example. An immediate green glow was observed which lasted for 3 days.

EXAMPLE 6

Example 1 was repeated using 140 g of α-methylstyrene having a number average molecular weight of 1300 and 40 g of CPPO. To 40 ml of the activator component prepared in Example 2 were added 5 g of the oxalate component of this Example and the procedure of Example 2 was repeated. An immediate green glow was observed which lasted in duration for 3 days.

EXAMPLE 7

This Example illustrates the preparation of the oxalate component via the solution method. A beaker with a magnetic stirrer and a beaker cover was the equipment employed for this Example. To the beaker were charged 100 g of homopolystyrene having a weight average molecular weight of 50,000, 33 g of CPPO and 400 g of methylene chloride. Stirring was maintained for 1 hour at 20° C. and a clear solution resulted. The solution was then subjected to rotary evaporation at 80° C. and thereafter the mass was allowed to evaporate to dryness. Example 2 was then repeated with 5 g of the resultant oxalate component being mixed with 40 g of the activator component. An immediate glow was observed which lasted for about 18 hours.

EXAMPLE 8

Example 7 was repeated using 50 g of homopolystyrene having a weight average molecular weight of 230,000, 16.6 g of CPPO and 500 g of methylene chloride. Example 2 was then repeated with 5 g of the resultant oxalate component being mixed with 40 g of the activator component. An immediate glow was observed which lasted for more than 2 days.

EXAMPLE 9

80 g of homopolystyrene having a weight average molecular weight of 160,000 and 20 g of CPPO were dissolved in 200 g of methylene chloride. The mixture was stirred for about one hour and 2 g of the same green fluorescer dye as employed in the above examples were added and stirring was continued for several minutes. Thereafter, strips of paper measuring about 2.5 cm×2.5 cm were dipped in the solution until they were saturated. The saturated paper strips were then allowed to dry in air. When the dried paper strips were contacted by the activator component of Example 2, an immediate glow was observed.

What is claimed is:

1. A chemiluminescent composition comprising:
   a) an oxalate component comprising a polymer containing an oxalate ester, said polymer being selected from the group consisting of homopolystyrene and homopoly-α-methylstyrene;

b) an activator component comprising a solution of a peroxide compound and a catalyst in a first solvent comprising a propylene glycol dialkyl ether containing one to three propylene moieties and each alkyl group is independently a straight-chain or branched-chain alkyl group containing up to 8 carbon atoms; and c) a fluorescer present in the oxalate component, activator component, or in both the oxalate component and the activator component.

2. The composition of claim 1 wherein the polymer has a weight average molecular weight of about 1,000 to 500,000.

3. The composition of claim 1 wherein the oxalate ester is present in the oxalate component in an amount of about $10^{-4}$ to 5M.

4. The composition of claim 1 wherein the oxalate component comprises a solid solution of the oxalate ester in the polymer.

5. The composition of claim 1 wherein the oxalate ester is selected from the group consisting of bis(2,4,5-trichloro-6-carbopentoxyphenyl)oxalate; bis(2,4,5-trichlorophenyl) oxalate; bis(2,4,5-tribromo-6-carbohexoxyphenyl)oxalate; bis(2-nitrophenyl)oxalate; bis(2,4-dinitrophenyl)oxalate; bis (2,6-dichloro-4-nitrophenyl) oxalate; bis(2,4,6-trichlorophenyl)oxalate; bis(3-trifluoromethyl-4-nitrophenyl)oxalate; bis(2-methyl-4,6-dinitrophenyl) oxalate; bis(1,2-dimethyl-4,6-dinitrophenyl)oxalate; bis(2,4-dichlorophenyl)oxalate; bis(2,4-dinitrophenyl)oxalate; bis (2,5-dinitrophenyl)oxalate; bis(2-formyl-4-nitrophenyl) oxalate; bis(pentachlorophenyl)oxalate; bis(1,2-dihydro-2-oxo-1-pyridyl)glyoxal; bis(2,4-dinitro-6-methylphenyl) oxalate; and bis-N-phthalimidyl oxalate.

6. The composition of claim 5 wherein the oxalate ester comprises bis(2,4,5-trichloro-6-carbopentoxyphenyl) oxalate.

7. The composition of claim 5 wherein the oxalate ester comprises bis(2,4,5-trichlorophenyl)oxalate.

8. The composition of claim 1 wherein the propylene glycol dialkyl ether contains two propylene moieties.

9. The composition of claim 8 wherein the propylene glycol dialkyl ether is selected from the group consisting of dipropylene glycol dimethyl ether, dipropylene glycol diethyl ether and dipropylene glycol di-t-butyl ether.

10. The composition of claim 9 wherein the first solvent comprises dipropylene glycol dimethyl ether.

11. The composition of claim 1 wherein the peroxide is present in an amount of about $10^{-5}$ to 15M.

12. The composition of claim 1 wherein the peroxide compound is selected from the group consisting of hydrogen peroxide; sodium peroxide; sodium perborate; sodium pyrophosphate peroxide; urea peroxide; histidine peroxide; t-butyl-hydroperoxide; and peroxybenzoic acid.

13. The composition of claim 12 wherein the peroxide compound comprises hydrogen peroxide.

14. The composition of claim 1 wherein the catalyst is present in an amount of about $1\times10^{-6}$ to $1\times10^{-1}$M.

15. The composition of claim 1 wherein the catalyst is selected from the group consisting of sodium salicylate; sodium-5-fluorosalicylate; sodium-5-chlorosalicylate; sodium-5-bromosalicylate; sodium trifluoroacetate; potassium salicylate; potassium pentachlorophenolate; lithium salicylate; lithium-3-chlorosalicylate; lithium-5-chlorosalicylate; lithium-3,5-dichlorosalicylate; lithium-3,5,6-trichlorosalicylate; lithium-2-chlorobenzoate; lithium-5-t-butylsalicylate; lithium trifluoroacetate; rubidium acetate; tetrabutylammonium salicylate; tetrabutylammonium tetrafluoborate; tetraethylammonium benzoate; tetrabutylammonium benzoate; tetrabutylammonium hexafluorophosphate; tetraethylammonium perchlorate; tetrabutylammonium perchlorate; tetraoctylammonium perchlorate; tetrabutylammonium-2,3,5-trichlorobenzoate; tetramethylammonium trifluoroacetate; magnesium salicylate; magnesium-5-t-butyl-salicylate; magnesium-3-chlorosalicylate; magnesium-3,5-dichloro-salicylate; and magnesium-3,5,6-trichlorosalicylate.

16. The composition of claim 15 wherein the catalyst comprises sodium-5-chlorosalicylate.

17. The composition of claim 15 wherein the catalyst comprises lithium-5-chlorosalicylate.

18. The composition of claim 1 wherein the fluorescer is present in the oxalate component or in the activator component or in both the oxalate component and the activator component in a total amount of about $10^{-5}$ to 5M.

19. The composition of claim 1 wherein the fluorescer is selected from the group consisting of 2-ethyl-9,10-bis (phenylethynyl)anthracene; 2-chloro-9,10-bis(4-ethoxyphenyl)anthracene; 2-chloro-9,10-bis (4methoxyphenyl)anthracene; 9,10-bis(phenylethynyl) anthracene; 1-chloro-9,10-bis(phenylethynyl)anthracene; 1,8-dichloro-9,10-bis(phenylethynyl)anthracene; 1,5-dichloro-9,10-bis(phenylethynyl)anthracene; 2,3-dichloro-9,10-bis(phenylethynyl)anthracene; 5,12-bis (phenylethynyl)tetracene; 9,10-diphenylanthracene; perylene; 1,6,7,12-tetraphenoxy-N,N'-bis(2,6-diisopropylphenyl)-3,4,9,10-perylene dicarboximide; 1,6,7,12-tetraphenoxy-N,N'-bis(2,5-di-t-butylphenyl)-3,4,9,10-perylene dicarboximide; 1,7-di-chloro-6,12-diphenoxy-N,N'-bis(2,6-diisopropylphenyl)-3,4,9,10-perylene dicarboximide; 1,6,7,12-tetra(p-bromophenoxy)-N,N'-bis(2,6-diisopropylphenyl)-3,4,9,10-perylene dicarboximide; 1,6,7,12-tetraphenoxy-N,N'-di-neopentyl-3,4,9,10-perylene dicarboximide; 1,6,7,12-tetra(p-t-butylphenoxy)N,N'-dineopentyl-3,4,9,10-perylene dicarboximide; 1,6,7,12-tetra (o-chlorophenoxy)-N,N'-bis(2,6-diisopropylphenyl)-3,4,9,10-perylene dicarboximide; 1,6,7,12-tetra(p-chlorophenoxy)-N,N'-bis(2,6-diisopropylphenyl)-3,4,9,10-perylene dicarboximide; 1,6,7,12-tetra(o-fluorophenoxy)-N,N'-bis(2,6-diisopropylphenyl)-3,4,9,10-perylene dicarboximide; 1,6,7,12-tetra(p-fluorophenoxy)-N,N'bis(2,6-diisopropylphenyl)-3,4,9,10-perylene dicarboximide; 1,6,7,12-tetraphenoxy-N,N'-diethyl-3,4,9,10-perylene dicarboximide; 1,7-dibromo-6,12-diphenoxy-N,N'-bis(2-isopropylphenyl)-3,4,9,10-perylene dicarboximide; 16,17-dihexyloxyviolanthrone; rubrene; and 1,4-dimethyl-9,10-bis (phenylethynyl)anthracene.

20. The composition of claim 19 wherein the fluorescer comprises 2-ethyl-9,10-bis(phenylethynyl) anthracene.

21. The composition of claim 19 wherein the fluorescer comprises 2-chloro-9,10-bis(4-ethoxyphenyl)anthracene.

22. The composition of claim 1 wherein the oxalate component is prepared by (a) heating the polymer to a temperature above its glass transition temperature but below the decomposition temperature of the oxalate ester and (b) mixing the oxalate ester with the heated polymer.

23. The composition of claim 1 wherein the oxalate component is prepared by (a) dissolving the polymer and the oxalate ester in a second solvent and (b) thereafter removing said second solvent at a temperature below the decomposition temperature of the oxalate ester.

24. The composition of claim 23 wherein the second solvent comprises methylene chloride.

* * * * *